Patented June 27, 1939

2,163,639

UNITED STATES PATENT OFFICE 2,163,639

COMPOSITION OF MATTER PRODUCED FROM POLYHYDRIC PHENOLS AND ALKYL AMINES

Harold Von Bramer and Albert C. Ruggles, Kingsport, Tenn., assignors, by mesne assignments, to Eastman Kodak Company, Jersey City, N. J., a corporation of New Jersey No Drawing. Application August 17, 1936, Serial No. 96,466

19 Claims. (Cl. 260—128)

This invention relates to new compositions of matter and more particularly to compositions of matter comprising reaction products of polyhydric phenols and primary or secondary alkyl primary amines and a process for the preparation thereof.

The reaction of methyl amine and hydroquinone has been described in German Patent 260,234 and in U. S. Patent 1,297,685. These patents are concerned with the production of N-methyl-p-aminophenol widely used, in the form of its sulphate, as a photographic developer, and, variously known in the trades as "Metol", "Elon", etc. Our copending application, Serial No. 697,527, filed Nov. 10, 1933, describes a method of preparing substantially pure N-methyl-p-aminophenol from methyl amine and hydroquinone.

Now, we have found that a polyhydric phenol containing at least two phenolic hydroxyl groups in the ortho or para position to one another can be reacted with primary or secondary alkyl primary amines containing at least four carbon atoms, with the elimination of water, to give complex compositions which analyses indicate are made up principally of N-alkylaminophenols together with attendant reaction products of higher molecular weight than the aminophenols. Ordinarily one of these attendant reaction products is apparently a N,N'-dialkylphenylenediamine. Whether our new reaction products are strictly mixtures or whether the ingredients are combined in chemical combination is not known. However, the reaction products do not behave as mixtures in that it has proven impossible to separate the various ingredients by fractional distillation, or, to separate the aminophenols from the reaction products by ordinary chemical means.

We have found that these new complex reaction products are excellent motor fuel stabilizers, surpassing the best known motor fuel stabilizers in several respects. Our new reaction products are characterized by their greater solubility in motor fuels consisting mainly of hydrocarbons, by their greater resistance to extraction by water and/or alkalies therefrom and by their decreased tendency to impart or induce color and/or turbidity therein, as compared with such well known motor fuel stabilizers as N-methyl-p-aminophenol and N-benzyl-p-aminophenol. These new reaction products are from about 4 to 7 times as soluble in motor fuels as N-benzyl-p-aminophenol and from about 120 to 190 times as soluble in motor fuels as N-methyl-p-aminophenol, from about 20 to 30 times as resistant to extraction by water from motor fuels as N-benzyl-p-aminophenol and from about 50 to about 75 times as resistant as N-methyl-p-aminophenol. These new reaction products are nearly twice as resistant to extraction by alkalies from motor fuel as either N-benzyl- or N-methyl-p-aminophenol. These new reaction products are more soluble in methanol than either N-benzyl or N-methyl-p-aminophenol. Motor fuels stabilized with these new reaction products, when allowed to stand in contact with water and iron undergo no discoloration and acquire no turbidity in six days as contrasted with N-methyl-p-aminophenol and N-benzyl-p-aminophenol each of which induces a brown color in the water layer after a few hours. Motor fuels stabilized with these new reaction products show no color or haze upon being exposed to direct sunlight for three hours as contrasted with motor fuels stabilized with N-methyl-p-aminophenol which show a slight haze and a yellow color after about one hour exposure and motor fuels stabilized with N-benzyl-p-aminophenol which show a yellow color and slight haze after about three hours exposure. Motor fuels stabilized with these new reaction products are described in our copending application, Serial No. 96,467, filed August 17, 1936.

In preparing our new reaction products, the primary or secondary amine is reacted with the polyhydric phenol under such conditions that water is eliminated between the phenol and the amine. We have found such conditions are advantageously an excess of amine and the substantial absence of diluents in the reaction mixture other than those formed during the reaction. Ordinarily from about one and one-quarter to about two and one-half molecular proportions of amine to each mole of polyhydric phenol are suitable. Proportions outside these advantageous limits can be used, however, as the molecular proportions of amine are increased above two and one-half the reaction products will be found to become less and less potent as motor fuel stabilizers, i. e., their gum inhibiting properties will be found to become less and less. As the molecular proportions of amine are decreased from one and one-quarter, the reaction products will be found to become less and less potent as motor fuel stabilizers, less and less soluble in the motor fuels, less and less resistant to extraction by water and/or alkalies therefrom, etc. Ordinarily no diluent other than the impurities found in the usual commercial amine (about 10% by weight or less of inert materials, such as water, alcohols, etc.) should be used. As the reaction mixture is diluted from this advantageous concentration, the reaction products will be found to become less and less soluble in motor fuels, less and less resistant to extraction therefrom, etc.

To effect a reaction, the polyhydric phenol and amine, the phenol advantageously being in solution in the excess amine, is heated, advantageously in a closed system such as an autoclave, at about 200° C. until the reaction becomes slow and practically ceases, e. g. for about 20 hours. The condensation can be effected at temperatures as low as 150° C. and as high as 250° C. without great difficulty. However, at the lower temperatures longer reaction times (20 to 30 hours) are necessary, while at higher temperatures, shorter reaction times (12 to 20 hours) suffice. Temperatures much higher than 250° C. are in general unsatisfactory and for that reason precautions to avoid local heating should be taken. This can be done by agitating the reaction mass. In a closed system, the pressure rises to about 225 pounds per square inch at 200° C., when amyl amines are used and to somewhat higher pressures when butylamines are used.

During the reaction, water is formed. This water of formation and any excess of amine can be distilled off following completion of the reaction. The amine thus recovered can be separated from the water which also distils by any suitable means. We have found that certain amines form azeotropes with water and hence cannot be separated from the water by fractional distillation. Amylamines are particularly difficult to handle in this respect. A satisfactory method of separating the amines from water is to add a polyhydric phenol to the amine-water mixture, when the amine and polyhydric phenol form a salt. The water can then be removed from this salt by introducing a liquid which forms an azeotrope with water boiling lower than the decomposition temperature of the salt. Diisopropyl ether is suitable for this purpose, in the case of amylamines and hydroquinone.

We can subject our new reaction products to distillation under reduced pressure in order to effect a purification, if desired. Pressures of 2 mm. of mercury or less are suitable. So distilled, our products are pale yellow liquids which solidify slowly on standing. The distillation serves to remove suspended carbonaceous and tarry matter but does not serve to separate our reaction products into discreet substances.

The following examples serve to illustrate but are not intended to limit our invention:

*Example 1.*—275 lbs. (1.25 mols) of primary normal butyl primary amine (containing about 9% by weight of water and other inert materials) were changed into a still provided with an agitator, a simple fractionating column, steam and cooling coils, surface condenser and an automatic liquid separator. 110 lbs. (1 mol) of hydroquinone were added and the whole was agitated until solution of the hydroquinone was effected. Heat may be applied to effect this solution. This so prepared solution was conveyed to an autoclave and heated therein at about 200° C. for about 20 hours. Following this treatment the reaction mixture was subjected to distillation in a rapid circulating evaporator, when any excess butylamine and the water of formation distilled off. The residue was thoroughly dried and degassed of remaining traces of butylamine. The degassed material was transferred to a high vacuum still and distilled under a pressure of 2 mm. or less. The product is a pale yellow liquid which solidifies slowly on standing. The product needs no further purification. It can be used as a motor fuel stabilizer in the solid form, but is preferably introduced into the motor fuel from a 50% (weight) solution in a solvent composed of 90% methanol and 10% butanol or other suitable solvent.

*Example 2.*—557 lbs. (6.0 mols) of commercial primaryamylprimaryamine (usually containing about 10% by weight of water and other inert materials, usually having a boiling range from about 85° C. to about 105° C. and comprising a plurality of isomeric amines) were charged into a still provided with an agitator, a simple fractionating column, steam and cooling coils, surface condenser and an automatic liquid separator. 300 lbs. (2.7 mols) of hydroquinone were added and the whole was agitated until solution of the hydroquinone was effected. Heat may be applied to effect this solution. This so prepared solution was conveyed to an autoclave and heated therein at about 200° C. for about 20 hours. Following this treatment the reaction mixture was subjected to distillation in a rapid circulating evaporator, when the excess amylamine and the water of formation distilled off. The residue was thoroughly dried and degassed of remaining traces of amylamine. The degassed material was transferred to a high vacuum still and distilled under a pressure of about 2 mm. or less. The product is a pale yellow liquid which solidifies slowly on standing. The product needs no further purification. It can be used as a motor fuel stabilizer in the solid form, but is preferably introduced into the motor fuel from a 50% (weight) solution in a solvent composed of 90% methanol and 10% butanol or other suitable solvent.

The excess amylamines and the water of formation which distilled off from the rapid circulating evaporator were returned to the mixing tank. 100 gallons of diisopropyl ether and 300 lbs. of hydroquinone were added. The whole was distilled at atmospheric pressure. The water and diisopropyl ether distilled as an azeotrope leaving a residue which was a salt of hydroquinone and amylamines. This residue can be used in preparing the next batch of reaction product. Instead of diisopropyl ether any liquid can be used, which forms a suitable azeotrope with water, i. e., one boiling lower than the decomposition temperature of the phenol-amine salt. Any alkyl amine forming a salt with a polyhydric phenol can be separated from water in this manner.

The better products for the stabilization of motor fuels, prepared as indicated above, appear to contain a weight of attendant reaction products equal to from about 5% to about 25% of the total weight of both the principal and attendant reaction products. Smaller amounts of these attendant reaction products have a beneficial effect and products containing 50% by weight or more of attendant reaction products are useful as motor fuel stabilizers.

The polyhydric phenols employed can be substituted on the nucleus by groups such as methyl, methoxy and the like. Catechol, hydroquinone and pyrogallol yield products which are powerful motor fuel stabilizers, but from all standpoints these products prepared as indicated above, from either unsubstituted catechol or hydroquinone, particularly the latter, are especially useful as motor fuel stabilizers. About two and one-half molecular proportions of amine for each molecular proportion of pyrogallol is ordinarily most advantageous.

Various higher primary or secondary alkyl primary amines, such as normal primary butyl, normal secondary butyl, normal primary amyl, isoamyl, isohexyl, isobutyl and the like as well as mixtures thereof can be used. The secondary alkyl amines appear to react more slowly than the primary alkyl amines and accordingly the higher of the reaction temperatures given above are ordinarily advantageous when employing secondary alkyl amines. Frequently commercial amines contain mixtures of primary and secondary amines and because of the slower reaction of the secondary amines they will ordinary be found to accumulate in the recovered amines. The reaction products prepared from the primary alkyl primary amines are definitely superior to those prepared from secondary alkyl primary amines as motor fuel stabilizers.

In preparing our new reaction products, as indicated above, catalysts can be added to the reaction mixtures or the amines can be used in the form of derivatives which decompose under the conditions of the reaction to yield the amine.

In accordance with accepted chemical nomenclature, "primary alkyl" is intended to mean an alkyl group derived from a primary alcohol by dropping the OH group; "secondary alkyl" to means an alkyl group derived from a secondary alcohol by dropping the OH group; "N-alkyl", "N-methyl" and "N-benzyl" to mean that the alkyl, methyl or benzyl group is attached to nitrogen.

What we claim as our invention and desire to be secured by Letters Patent of the United States of America is:

1. An aminophenol selected from the group consisting of N-alkyl-o-aminophenols and N-alkyl-p-aminophenols in which the alkyl group contains at least four carbon atoms, together with the attendant reaction products formed when preparing the N-alkylaminophenol from a primary amine selected from the group consisting of primary alkyl and secondary alkyl primary amines, having the general formula $C_nH_{2n+1}NH_2$, wherein $n$ represents a positive integer not smaller than four, and a polyhydric phenol selected from the group consisting of polyhydric phenols of the benzene series containing at least two phenolic hydroxyl groups in ortho position to one another and polyhydric phenols of the benzene series containing at least two phenolic hydroxyl groups in para position to one another.

2. A N-alkyl-p-aminophenol in which the alkyl group contains at least four carbon atoms together with the attendant reaction products formed when preparing the N-alkyl-p-aminophenol from hydroquinone and a primary alkyl primary amine of the following fomula

$$C_nH_{2n+1}NH_2$$

wherein $n$ represents a positive integer not smaller than four.

3. A N-butyl-p-aminophenol together with the attendant reaction products formed when preparing the N-butyl-p-aminophenol from hydroquinone and a primary butyl primary amine having the formula $C_4H_9NH_2$.

4. A N-amyl-p-aminophenol together with the attendant reaction products formed when preparing the N-amyl-p-aminophenol from hydroquinone and a primary amyl primary amine having the formula $C_5H_{11}NH_2$.

5. A process for preparing an aminophenol composition, useful as a motor fuel stabilizer, comprising reacting with the elimination of water, a polyhydric phenol selected from the group consisting of polyhydric phenols of the benzene series containing at least two phenolic hydroxyl groups in ortho position to one another and polyhydric phenols of the benzene series containing at least two phenolic hydroxyl groups in para position to one another with a primary amine selected from the group consisting of primary and secondary alkyl primary amines having the general formula $C_nH_{2n+1}NH_2$ wherein $n$ represents a positive integer not smaller than four.

6. A process for preparing an aminophenol composition, useful as a motor fuel stabilizer, comprising reacting with the elimination of water, in the presence of a diluent, one molecular proportion of a polyhydric phenol selected from the group consisting of polyhydric phenols of the benzene series containing at least two phenolic hydroxyl groups in ortho position to one another and polyhydric phenols of the benzene series containing at least two phenolic hydroxyl groups in para position to one another with from about one and a quarter molecular proportions to about two and a half molecular proportions of a primary amine selected from the group consisting of primary and secondary alkyl primary amines having the general formula $C_nH_{2n+1}NH_2$ wherein $n$ represents a positive integer not smaller than four, the amount of said diluent equaling not more than about ten percent by weight of the primary amine.

7. A process for preparing a composition of matter, useful as a motor fuel stabilizer, comprising reacting, at a temperature of from about 150° C. to about 250° C., one molecular proportion of a polyhydric phenol selected from the group consisting of polyhydric phenols of the benzene series containing at least two phenolic hydroxyl groups in ortho position to one another and polyhydric phenols of the benzene series containing at least two phenolic hydroxyl groups in para position to one another with from about one and a quarter to about two and a half molecular proportions of a primary amine selected from the group consisting of primary and secondary alkyl primary amines having the general formula $C_nH_{2n+1}NH_2$ wherein $n$ represents a positive integer not smaller than four.

8. A process for preparing a composition of matter, useful as a motor fuel stabilizer, comprising reacting, at a temperature of from about 150° C. to about 250° C. and in a closed vessel, one molecular proportion of a polyhydric phenol selected from the group consisting of polyhydric phenols of the benzene series containing at least two phenolic hydroxyl groups in ortho position to one another and polyhydric phenols of the benzene series containing at least two phenolic hydroxyl groups in para position to one another with from about one and a quarter to about two and a half molecular proportions of a primary amine selected from the group consisting of primary and secondary alkyl primary amines having the general formula $C_nH_{2n+1}NH_2$ wherein $n$ represents a positive integer not smaller than four.

9. A process for preparing a composition of matter, useful as a motor fuel stabilizer, comprising reacting, at a temperature of from about 150° C. to about 250° C. in a closed vessel and in the presence of a diluent, one molecular proportion of a polyhydric phenol selected from the group consisting of polyhydric phenols of the benzene series containing at least two phenolic hydroxyl groups in ortho position to one another and polyhydric phenols of the benzene series containing at least two phenolic hydroxyl groups in para position to one another with from about one and a quarter to about two and a half molecular proportions of a primary amine selected from the group consisting of primary alkyl and secondary alkyl primary amines having the general formula $C_nH_{2n+1}NH_2$ wherein $n$ represents a positive integer not smaller than four, the amount of said diluent equaling not more than about ten percent by weight of the primary amine.

10. A process for preparing a composition of matter, useful as a motor fuel stabilizer, comprising reacting, at a temperature of from about 150° C. to about 250° C. in a closed vessel and in the presence of a diluent, one molecular proportion of a polyhydric phenol selected from the group consisting of polyhydric phenols of the benzene series containing at least two phenolic hydroxyl groups in ortho position to one another and polyhydric phenols of the benzene series containing at least two phenolic hydroxyl groups in para position to one another with from about one and a quarter to about two and a half molecular proportions of a primary alkyl primary amine having the general formula $C_nH_{2n+1}NH_2$ wherein $n$ represents a positive integer not smaller than four, the amount of said diluent equaling not more than about ten percent by weight of the primary amine.

11. A process for preparing a composition of matter, useful as a motor fuel stabilizer, comprising reacting, at a temperature of from about 150° C. to about 250° C. and in a closed vessel, one molecular proportion of hydroquinone with from about one and a quarter to about two and a half molecular proportions of a primary amine selected from the group consisting of primary and secondary alkyl primary amines having the general formula $C_nH_{2n+1}NH_2$ wherein $n$ represents a positive integer not smaller than four.

12. A process for preparing a composition of matter, useful as a motor fuel stabilizer, comprising reacting, at a temperature of from about 150° C. to about 250° C., one molecular proportion of hydroquinone with from about one and a quarter to about two and a half molecular proportions of a primary alkyl primary amine having the general formula $C_nH_{2n+1}NH_2$ wherein $n$ represents a positive integer not smaller than four.

13. A process for preparing a composition of matter, useful as a motor fuel stabilizer, comprising reacting, at a temperature of from about 150° C. to about 250° C. and in a closed vessel, one molecular proportion of hydroquinone with from about one and a quarter to about two and a half molecular proportions of a primary alkyl primary amine having the general formula $C_nH_{2n+1}NH_2$ wherein $n$ represents a positive integer not smaller than four.

14. A process for preparing a composition of matter, useful as a motor fuel stabilizer, comprising reacting, at a temperature of from about 150° C. to about 250° C. in a closed vessel and in the presence of a diluent, one molecular proportion of hydroquinone with from about one and a quarter to about two and a half molecular proportions of a primary alkyl primary amine having the general formula $C_nH_{2n+1}NH_2$ wherein $n$ represents a positive integer not smaller than four, the amount of said diluent equaling not more than about 10% by weight of the primary amine.

15. A process for preparing a composition of matter, useful as a motor fuel stabilizer, comprising reacting, at a temperature of from about 150° C. to about 250° C. in a closed vessel and in the presence of a diluent, one molecular proportion of hydroquinone with from about one and a quarter to about two and a half molecular proportions of a primary butyl primary amine having the formula $C_4H_9NH_2$, the amount of said diluent equaling not more than about 10% by weight of the primary amine.

16. A process for preparing a composition of matter, useful as a motor fuel stabilizer, comprising reacting, at a temperature of from about 150° C. to about 250° C. in a closed vessel and in the presence of a diluent, one molecular proportion of hydroquinone with from about one and a quarter to about two and a half molecular proportions of a primary amyl primary amine having the formula $C_5H_{11}NH_2$, the amount of said diluent equaling not more than about 10% by weight of the primary amine.

17. A process for preparing a composition of matter, useful as a motor fuel stabilizer, comprising reacting, at a temperature of about 200° C. in a closed vessel and in the presence of a diluent, one molecular proportion of hydroquinone with from about one and a quarter to about two and a half molecular proportions of a primary alkyl primary amine having the general formula $C_nH_{2n+1}NH_2$ wherein $n$ represents a positive integer not smaller than four, the amount of said diluent equaling not more than about 10% by weight of the primary amine.

18. A process for preparing a composition of matter, useful as a motor fuel stabilizer, comprising reacting with the elimination of water, at a temperature of from about 150° C. to about 250° C. in a closed vessel, one molecular proportion of a polyhydric phenol selected from the group consisting of, polyhydric phenols of the benzene series containing at least two phenolic hydroxyl groups in ortho position to one another and polyhydric phenols of the benzene series containing at least two phenolic hydroxyl groups in para position to one another with from about one and a quarter to about two and a half molecular proportions of a primary amine selected from the group consisting of primary alkyl and secondary alkyl primary amines having the general formula $C_nH_{2n+1}NH_2$ wherein $n$ represents a positive integer not smaller than four, separating the unreacted primary amine and the water, admixing a polyhydric phenol with the primary amine and water to form a salt between the polyhydric phenol and the primary amine, admixing diisopropyl ether with the salt and water and distilling to remove the water and ether as an azeotrope.

19. In a process which gives rise to a mixture of water and an alkyl amine, a process for separating the water and the alkyl amine comprising admixing a polyhydric phenol with the alkyl amine and water to form a salt between the alkyl amine and polyhydric phenol, admixing diisopropyl ether with the mixture of the salt and water and distilling to remove the water and ether as an azeotrope.

HAROLD VON BRAMER.
ALBERT C. RUGGLES.

Certificate of Correction

Patent No. 2,163,639. June 27, 1939.

HAROLD VON BRAMER ET AL.

It is hereby certified that errors appear in the printed specification of the above numbered patent requiring correction as follows: Page 3, first column, line 55, for "fomula" read *formula;* and second column, line 62, for "$C_nH_{n+1}NH_2$" read $C_nH_{2n+1}NH_2$; and that the said Letters Patent should be read with these corrections therein that the same may conform to the record of the case in the Patent Office.

Signed and sealed this 19th day of September, A. D. 1939.

[SEAL]

HENRY VAN ARSDALE,
*Acting Commissioner of Patents.*